US012222693B1

United States Patent
Zuccone et al.

(10) Patent No.: US 12,222,693 B1
(45) Date of Patent: Feb. 11, 2025

(54) SYSTEM FOR RECONFIGURING VEHICLE SYSTEMS TO MODIFY CORRESPONDING VEHICLE FUNCTIONS

(71) Applicant: IPF Tuning, Steamboat Springs, CO (US)

(72) Inventors: Todd Zuccone, Seamboat Springs, CO (US); Arno Schindler, Froendenberg (DE)

(73) Assignee: IPF Tuning, Steamboat Springs, CO (US)

( * ) Notice: Subject to any disclaimer, the term of this patent is extended or adjusted under 35 U.S.C. 154(b) by 0 days.

(21) Appl. No.: 17/585,034

(22) Filed: Jan. 26, 2022

Related U.S. Application Data (60) Provisional application No. 63/141,629, filed on Jan. 26, 2021.

(51) Int. Cl.
*G05B 19/042* (2006.01)
*B60K 35/00* (2006.01)
*B60W 50/00* (2006.01)
*B60W 50/14* (2020.01)
*G07C 5/00* (2006.01)
*G07C 5/08* (2006.01)
*B60K 35/28* (2024.01)
*B60W 10/06* (2006.01)
*B60W 10/10* (2012.01)
*B60W 10/22* (2006.01)

(52) U.S. Cl.
CPC .......... *G05B 19/0426* (2013.01); *B60K 35/00* (2013.01); *B60W 50/00* (2013.01); *B60W 50/14* (2013.01); *G07C 5/008* (2013.01); *G07C 5/0808* (2013.01); *B60K 35/28* (2024.01); *B60K 2360/167* (2024.01); *B60W 10/06* (2013.01); *B60W 10/10* (2013.01); *B60W 10/22* (2013.01); *B60W 2050/0083* (2013.01); *B60W 2050/146* (2013.01); *B60W 2556/45* (2020.02); *G05B 2219/2637* (2013.01); *G07C 2205/02* (2013.01)

(58) Field of Classification Search
CPC ... G05B 19/00; G05B 19/0426; B60W 50/00; G07C 5/008

See application file for complete search history.

(56) References Cited

U.S. PATENT DOCUMENTS

| | | |
|---|---|---|
| D379,599 S | 6/1997 | Dobeck et al. |
| 5,707,560 A | 1/1998 | Nevin |
| 5,859,369 A | 1/1999 | Meyer et al. |
| 6,681,752 B1 | 1/2004 | Kreikemeier et al. |
| 6,745,620 B2 | 6/2004 | Kreikemeier et al. |
| 7,366,589 B2 | 4/2008 | Habermas |
| 8,302,468 B2 | 11/2012 | Evers |
| 9,286,264 B2 | 3/2016 | Johnson et al. |

(Continued)

OTHER PUBLICATIONS

Screen capture of WiGET for MX-Tuner webpage, available at https://apps.apple.com/us/app/wiget/id768095762, accessed Nov. 5, 2020.

(Continued)

*Primary Examiner* — John Kwon
(74) *Attorney, Agent, or Firm* — Boyle Fredrickson, S.C.

(57) ABSTRACT

A system for reprogramming vehicle performance control and/or display systems is provided. The system may allow for automatically flashing various vehicle controllers and provide diagnostic capabilities.

14 Claims, 9 Drawing Sheets

(56) References Cited

U.S. PATENT DOCUMENTS

| | | | |
|---|---|---|---|
| 9,644,969 | B2 | 5/2017 | Koenig et al. |
| 9,911,251 | B2 | 3/2018 | Fountain |
| 9,928,669 | B2 | 3/2018 | Yehezkel et al. |
| 10,037,633 | B2 | 7/2018 | Gintz et al. |
| 10,586,217 | B2 | 3/2020 | Wilson |
| 10,614,640 | B2 | 4/2020 | Gintz et al. |
| 10,621,796 | B2 | 4/2020 | Gintz et al. |
| 10,661,797 | B2 | 5/2020 | Chack et al. |
| 10,776,098 | B2 * | 9/2020 | Hong .................. G07C 5/008 |
| 2012/0167071 | A1 | 6/2012 | Paek |
| 2015/0230044 | A1 | 8/2015 | Paun |
| 2016/0266886 | A1 * | 9/2016 | Sarkar ................ H04W 4/50 |
| 2019/0152468 | A1 | 5/2019 | Hall et al. |
| 2020/0174780 | A1 * | 6/2020 | Gintz .................. G06F 8/66 |
| 2020/0193739 | A1 | 6/2020 | Gintz et al. |
| 2020/0202645 | A1 * | 6/2020 | Gintz ................ G07C 5/0825 |
| 2020/0219335 | A1 * | 7/2020 | Gintz .................. G06F 8/71 |
| 2020/0302704 | A1 | 9/2020 | Khanna |

OTHER PUBLICATIONS

Screen capture of ProFlex Commander webpage, available at https://www.advancedfueldynamics.com/products/proflex-commander-for-can-am-maverick-x3-turbo#description-1, accessed Nov. 5, 2020.

Screen capture of Suzuki MX Tuner webpage, available at https://suzukicycles.com/~/media/PDF/Suzuki%20RM-Z_MX-Tuner_OneSheet_F2, accessed Nov. 5, 2020.

Screen capture of App Store—Yamaha Power Tuner webpage, available at https://apps.apple.com/us/app/power-tuner-app/id1235945328, accessed Nov. 5, 2020.

Screen capture of Yamaha Power Tuner Phone App webpage, available at https://www.yamahamotorsports.com/motocross/pages/yamaha-power-tuner-smart-phone-app, accessed Nov. 5, 2020.

\* cited by examiner

SYSTEM FOR RECONFIGURING VEHICLE SYSTEMS TO MODIFY CORRESPONDING VEHICLE FUNCTIONS

CROSS-REFERENCE TO RELATED APPLICATIONS

This application claims the benefit of U.S. Provisional Application No. 63/141,629 filed Jan. 26, 2021, which is incorporated herein by reference in its entirety.

FIELD OF THE INVENTION

The invention relates generally to vehicle control systems, such control systems for off-road vehicles and on-road vehicles, and, in particular, to a system to reprogram or reconfigure various vehicle control systems to modify a vehicle's performance characteristics.

BACKGROUND OF THE INVENTION

Modifying off-road, on-road, and other vehicles to alter various vehicle functions is well known. Popular modifications include those that increase vehicle performance. As vehicles evolve in complexity with more reliance on electronic controls for controlling vehicle systems, the ways of achieving performance modifications also evolve. Examples include modifying engine performance of modifying software or "tuning" how a vehicle's computer such as an engine control unit (ECU) controls the engine. One option for electronic engine tuning includes implementing a piggyback system that plugs into a vehicle's communication system and modifies various control or sensor signals to provide modified control signals while leaving the ECU's programming in its stock form. Other options for electronic engine tuning include replacing a stock ECU with a modified ECU that has different programming or reprograming the stock ECU with different control software, typically referred to as flashing or re-flashing with a program or tune.

As vehicles have become more technologically sophisticated, performance tuning and other modifications have also become more complex. For example, a more powerful and complex engine typically requires a more complicated tune or program and the importance of the tune's proper installation is increased in order to protect the mechanical integrity of the engine. In response, some companies have specialized or developed expertise in performance tuning, including some that specialize in developing and providing performance tunes (program or tune-providers) to other tuning shops or customers.

However, tune-providers are typically not onsite at the tuning shops to help with, for example, re-flashing type tuning. Since the tune-provider is typically the expert in their particular product(s) and suitable end-applications, at times, particular installations can be challenging for tuning shops. Additionally, the tune-provider's ability to oversee and confirm suitability of particular tunes for particular applications also presents challenges.

SUMMARY OF THE INVENTION

In accordance with a first aspect of the invention, a system is provided that substantially automates reconfiguring a vehicle system in a manner that ensures the appropriateness of a modification for a particular application, as well as the integrity of the control program being installed or (re) flashed to the memory of a corresponding vehicle controller.

The vehicle controller may be, for example, an engine control unit (ECU), a transmission control unit (TCU), a body control module (BCM), a shock control module (SCM), or a dashboard cluster module (DCM).

In accordance with another aspect of the invention, the system may provide real-time closed loop processing to perform various functions, including identifying, modifying, and controlling vehicle controller software, including updating the vehicle controller's software.

In accordance with another aspect of the invention, the system may include a provider-side system, a user-side system, and a general communications system that is typically the internet. The provider-side system includes a server system that may include a system server, a control server, a data server, and various backup servers. The provider-side system may also include a provider control system configured for administrative-type data and other control, including selective control of various files and options. The user-side system may include the particular vehicle controller as well as a vehicle operator (VO) device that connects to the vehicle's diagnostic port and may define a smart or intelligent VO device, which is configured as a master controller device. In this way, the VO device typically automatically and fully performs various system functions during the vehicle system modification session. These may include various critical or major system functions, such as requesting vehicle identification information and/or identification of various vehicle systems or components, including the vehicle controller being updated, as well as writing or otherwise installing the control program onto the memory of the respective vehicle controller.

According to another aspect of the invention, the user-side system may further include an information gateway (IG) device that communicates with the VO device. The VO device and IG device typically communicate with each other wirelessly, for example, by way of a close-range communication protocol such as Bluetooth-Low-Energy (BLE) personal area network technology. The IG device provides an information conduit from the VO device to the provider-side system, which is typically done through the internet, using the IG device's internet connection.

According to another aspect of the invention, the IG device may be implemented as, for example, a personal electronic device such as a smartphone, tablet, laptop computer, or the like, and it may at least partially define a human-machine-interface (HMI) system through which the user interacts with the system.

According to another aspect of the invention, the HMI system is at least partially defined by a program or mobile application (APP) that is installed on the personal electronic device. The APP provides a graphical use interface (GUI) on the personal electronic device's display that allows the HMI system implemented through the APP to facilitate user interactions with the system as an input/output mechanism. The HMI system may further include display features of the VO device that are configured to convey certain information to the user, independent of the personal electronic device's display. In one example, the VO device may include a light-based display such as one or more LEDs (light emitting diodes) that may illuminate in different colors and/or blinking sequences to indicate, for example, statuses or phases of the flash procedure and/or other vehicle system modification session.

According to another aspect of the invention, the system may provide multiple operating or use platforms, such as a workshop or dealer platform for professional use and an individual user or retail platform for personal use. The dealer and retail platforms may differ in how the VO devices are configured and their corresponding operability. The dealer and retail platforms may also differ in payment systems or types. Shops or dealers using the dealer platform purchase programs or other features in different ways compared to how individuals or retail users of the retail platform purchase the same programs or other features.

According to another aspect of the invention, each VO device may be serialized or otherwise uniquely identifiable to the system. This allows each VO device to operate in different modes based on which platform it will be used with. The system provides different levels of permissions or enables/disables various features based on the expected use of each particular VO device, such as use on the dealer platform compared to use on the retail platform.

According to another aspect of the invention, a VO device in workshop mode (a workshop VO device) may be usable by multiple users at the shop and usable with multiple different vehicles. If a shop or dealer has multiple locations, then the dealer may have multiple workshop VO devices, such as at least one at each location. All the dealer's workshop VO devices may be associated with the dealer's account on the dealer platform so that each of dealer's workshop VO devices has shared access to the system according to the dealer's account status.

According to another aspect of the invention, a VO device in retail purchaser mode (a retail VO device) may be usable by a single user and with a single vehicle. This may be accomplished by way of vehicle identification (VIN) locking the particular retail VO device to the retail user's vehicle through a stored record of the vehicle's VIN as associated with the serial number or other unique identifier of that particular retail VO device.

According to another aspect of the invention, the system may establish the initial mode of each VO device and/or switch the modes of a particular VO device to reconfigure or convert a workshop VO device to a retail VO device or vice versa based on which of the dealer and retail platform(s) it will be used.

These modes may include a workshop mode and a retail purchaser mode, which configure the VO device to function in different ways, which may include access to different features from the provider as well as payment by way of different payment systems. Dealer users of the dealer platform may use a credit system whereas retail platform users may use an option system.

According to another aspect of the invention, real time closed loop automotive controller software may be added and sent back as an information container through a user gateway by way of the internet to an intelligent vehicle operator device. When the automotive controller is ready to receive the data, the intelligent vehicle operator device automatically performs a software flash (re) programming and the process of that programming is transferred as progress by cable or wirelessly over BLE to the user or customer information gateway. After reconnection to the provider-side system, the intelligent vehicle operator device sends a secret message to the automotive controller to receive back the ability status of the automotive controller to receive the real time functionality behavior that could be at least one of: 1) adjustable launch control, 2) adjustable boost control, 3) adjustable traction control, 4) adjustable power control, 5) adjustable torque control, 6) multimap control, and 7) fuel control, etc. The control algorithm may be transferred wirelessly from the intelligent vehicle operator device to the user gateway, to be physically controlled by the user/customer or workshop. The control algorithm parameters are transferred wirelessly from the intelligent vehicle operator device to the user gateway to be physically controlled by the customer or workshop with their fingertips. The control algorithm parameters may then be sent wirelessly from the user gateway to the intelligent vehicle operator device. From there, the control algorithm parameters may be processed and sent from the intelligent vehicle operator device to the automotive controller that is performing the real time functionality due to the customers' or workshop needs and behavior.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the scope of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 1:
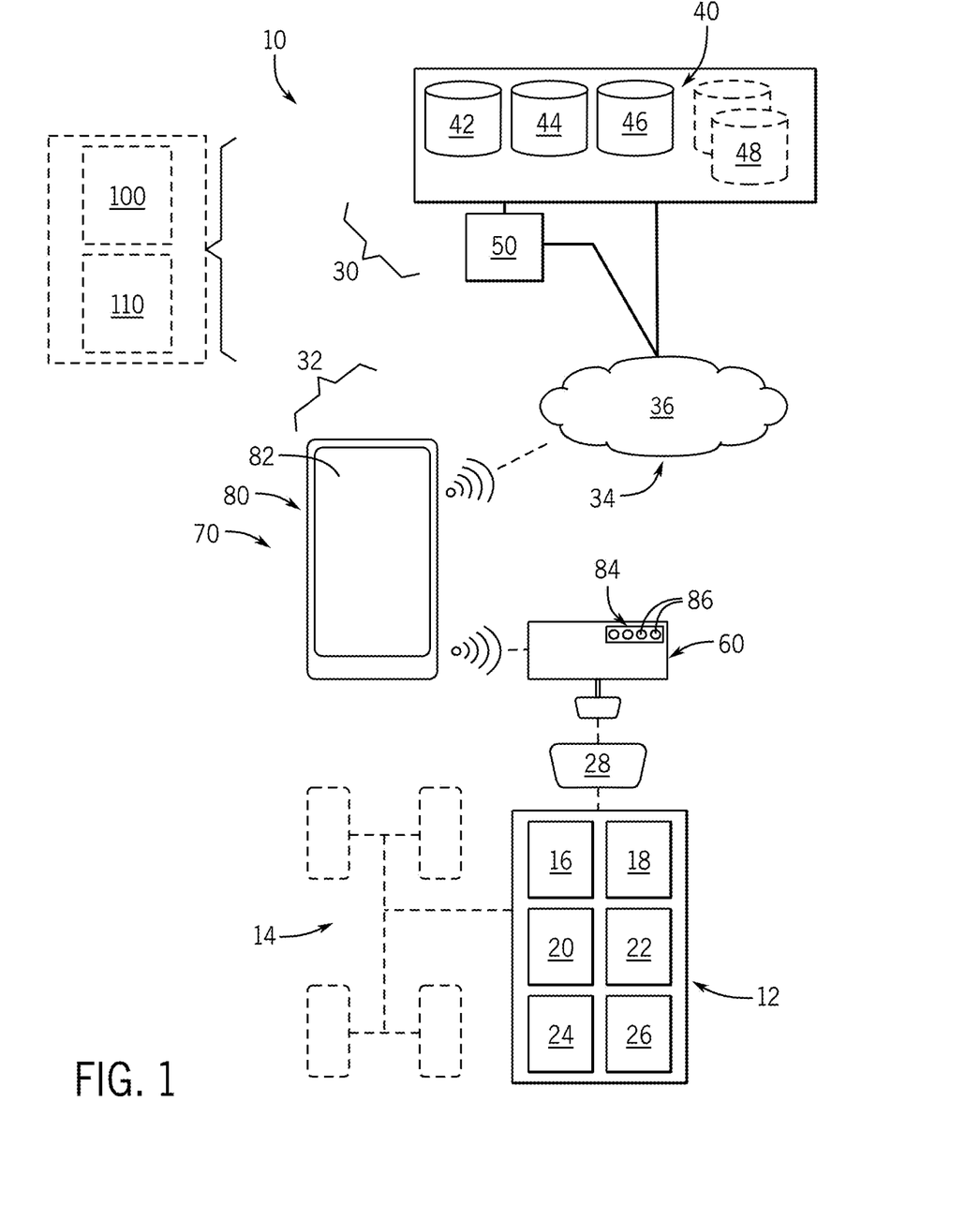
FIG. 1 is a schematic representation of a system for reconfiguring vehicle systems to modify corresponding vehicle functions in accordance with an aspect of the invention.

Referring now to the drawings and initially to FIG. 1, a system for reconfiguring vehicle systems to modify corresponding vehicle functions is represented as system 10. The vehicles systems that system 10 modifies include vehicle control system 12 of a vehicle 14 that has at least one vehicle controller, each of which may be implemented as a vehicle-type control computer with a microprocessor along with suitable software and corresponding memory that stores such software and hardware including interconnecting conductors for power and signal transmission and communication for controlling electronic, electro-mechanical, or other components, depending on what components or systems is controlled by the vehicle controller(s). The vehicle controller(s) includes, for example, an engine control unit (ECU) 16, a transmission control unit (TCU) 18, a body control module (BCM) 20, a dashboard cluster module (DCM) 22, a geo control module (GCM) 24, and shock control module (SCM) 26. ECU 16 is configured to control the vehicle's engine and TCU 18 is configured to control the vehicle's transmission. BCM 20 is configured to control the vehicle's body-related components accessories, which may be body-mounted or related accessories such as lights, door locks and other security systems, window controls, and climate control systems. DCM 22 is configured to control a dashboard display 23 (FIGS. 5-7) that provides an electronic gauge cluster that displays vehicle and operational information. GCM 24 is configured to provide global positioning system (GPS) locating and related services for vehicle 14. SCM 26 is configured to control the vehicle's suspensions system/shock absorbers. The various controllers may be integrated with or remain separate but communicate with each other and the vehicle control system 12 may include yet other computers or controllers which coordinate their interoperability, such as a powertrain control module (PCM, not shown) that may communicate with and coordinate actions of, for example, ECM 16 and TCU 18. Regardless of the particular modules or controllers within vehicle control system 12, vehicle 14 has a diagnostic port 28 that is operably connected to a diagnostic or data/communications bus such as a CAN bus of the vehicle that uses an appropriate vehicle communications protocol, such as J1939.

Still referring to FIG. 1, system 10 may include a provider-side system 30, a user-side system 32, and a general communications system 34 that is typically implemented through the internet 36. The provider-side system 30 includes a server system 40 that may include a system server(s) 42, a control server(s) 44, a data server(s) 46, and various backup servers 48. The provider-side system 30 may also include a provider control system 50 configured for backend-control, including administrative-type data and other control, such as selective control of various files and options. Like the vehicle controllers 16, 18, 20, 22, 24, 26 each of the servers in server system 40 and controller components of provider control system 50 has suitable software and hardware, including memory to store and execute programs and data as well as conductors for power and/or data transmission and suitable communication or other devices, as needed for the particular configuration.

Still referring to FIG. 1, the user-side system 32 may include the particular vehicle controller 16, 18, 20, 22, 24, 26 as well as a vehicle operator (VO) device 60 that connects to the vehicle's diagnostic port 28 and may define a smart or intelligent VO device, which is configured as a master controller device. In this way, the VO device 60 typically automatically and fully performs various system functions during a vehicle system modification session. These may include various critical or major system functions, such as requesting vehicle identification information and/or identification of various vehicle systems or components, including the vehicle controller being updated, as well as writing or otherwise installing the control program onto the memory of the respective vehicle controller 16, 18, 20, 22, 24, 26. It is understood that besides a connector suitable for connecting the VO device 60 to the vehicle's diagnostic port 28, VO device 60 may have at least one additional communications or data connector or port for connecting VO device 60 to another device. In one example, VO device 60 further includes a USB-C port that can allow a wired connection to an external GPS unit or module or other suitable external device. Such USB-C or other port may facilitate connecting the VO device 60 to a Windows-based PC for various back-end firmware updates and VO serializing. In another example, the USB-C port may be used to connect the VO device 60 to a windows-based PC, which implements a windows program that communicates with the server system 40 to wire connect and transmit various files directly to the VO device 60.

Still referring to FIG. 1, information gateway (IG) device 70 within user-side system 32 communicates with VO device 60. This is typically done wirelessly, for example, by way of a close-range communication protocol such as Bluetooth-Low-Energy (BLE) personal area network technology. The IG device 70 provides an information conduit through which the VO device 60 communicates with the provider-side system 30. Communication between VO device 60 and provider-side system 30 as facilitated by IG device 70 is typically done through the internet 36, using the IG device's internet connection.

Still referring to FIG. 1, the IG device 70 is typically implemented as, for example, a personal electronic device such as a smartphone, tablet, laptop computer, or the like. The personal electronic device as IG device 70 may at least partially define a human-machine-interface (HMI) system 80 through which the user interacts with the system 10. A program or mobile application (APP) may be installed on the personal electronic device as IG device 70 to provide at least some of the functionality of the HMI system 80. The APP typically provides a graphical use interface (GUI) 82 on the personal electronic device's display that allows the HMI system 80 implemented through the APP to facilitate user interactions with the system 10 as an input/output mechanism. The HMI system 80 may further include display features of the VO device 60 that are configured to convey certain information to the user. For example, VO device 60 is shown with a light-based display 84 such as one or more LEDs (light emitting diodes) 86 that may illuminate in different colors and/or blinking sequences to indicate, for example, statuses or phases of the flash procedure and/or other vehicle system modification session.

Still referring to FIG. 1, system 10 may provide multiple operating or use platforms. These may include a workshop or dealer platform 100 for professional use and an individual user or retail platform 110 for personal use. The dealer and retail platforms 100, 110 may provide different configurations for the VO devices 60, with different corresponding operability characteristics. The dealer and retail platforms 100, 110 may also differ in payment systems or types. Shops or dealers using the dealer platform 100 may purchase programs or other features in different ways compared to how individuals or retail users of the retail platform 110 would purchase the same programs or other features.

Still referring to FIG. 1, regardless of the particular way that purchases are made through the dealer and retail platforms 100, 110, system 10 may selectively configure each VO device 60 to be compatible with the particular platform 100, 110 with which it will be used. As one example, each VO device 60 may be serialized or otherwise uniquely identifiable to the system 10. This allows each VO device 60 to operate in different modes based on which platform it will be used with, such as a workshop mode on the dealer platform 100 or a retail purchaser mode on the retail platform 110. The system provides different levels of permissions or enables/disables various features based on the expected use of each particular VO device 60, corresponding to the platform 100, 110 on which the VO device 60 is being used.

Figure 2:
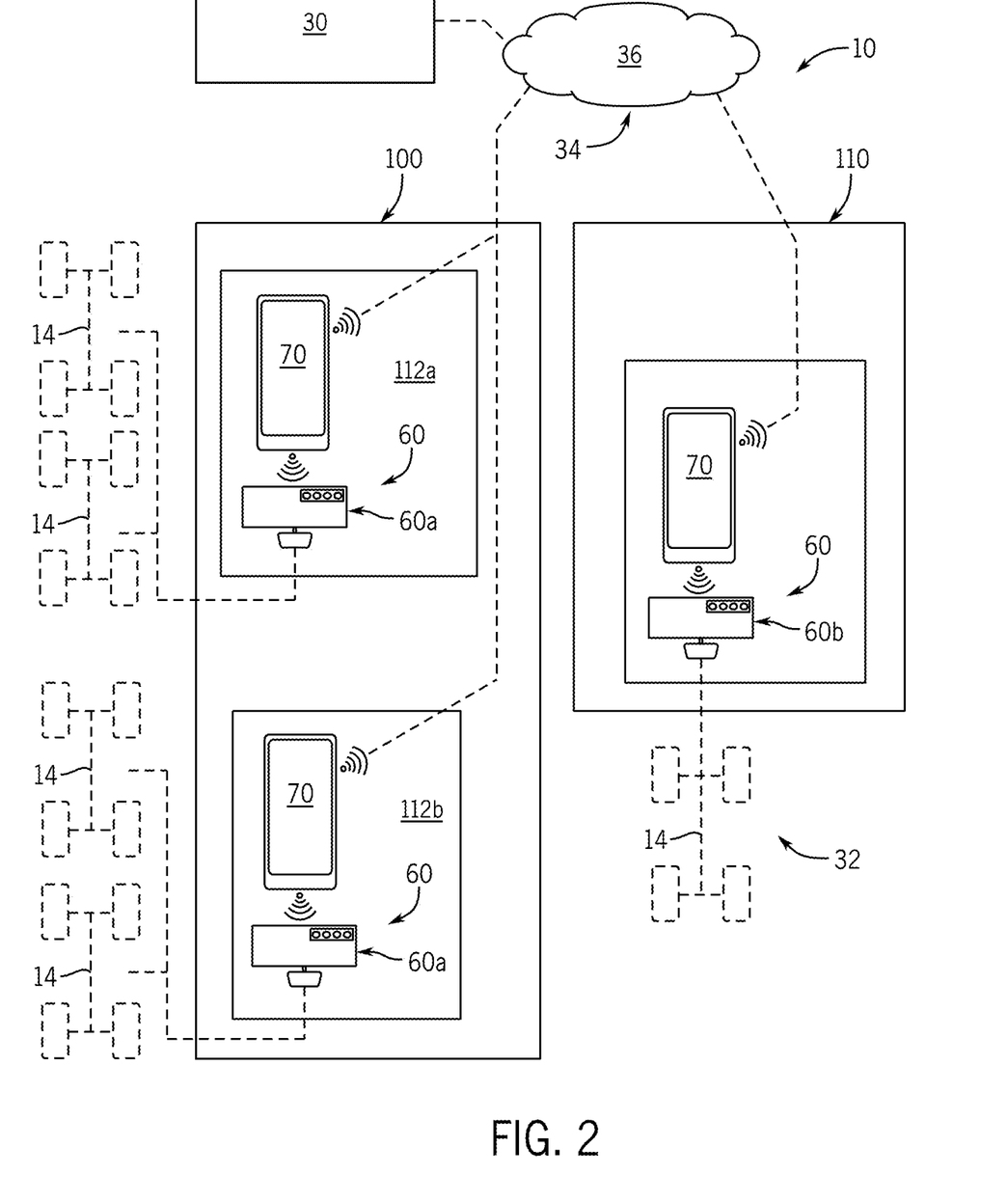
FIG. 2 is a schematic representation of the system implementing a workshop mode in accordance with an aspect of the invention.

Referring now to FIG. 2, a VO device 60 in workshop mode defines a workshop VO device 60a and a VO device 60 in a retail mode defines a retail VO device 60b. A workshop VO device 60a may be usable by multiple users at the shop and usable with multiple different vehicles 14. If a shop or dealer has multiple locations 112a, 112b, then the dealer may have multiple workshop VO devices 60a, such as at least one at each location. All the dealer's workshop VO devices 60a may be associated with the dealer's account on the dealer platform 100 so that each of dealer's workshop VO devices 60a has shared access to the system 10 according to the dealer's account status.

Still referring to FIG. 2, the workshop VO device 60a defines a workshop unlocked state in which it is configured to be used for tuning or otherwise modifying multiple vehicles 14. This allows, for example, a professional shop to use a single VO device 60 to tune or otherwise work on its customer's vehicles 14, which may include allowing multiple technicians at the shop to use the single workshop VO device 60a. In some implementations, workshop VO devices 60a may be operable with multiple vehicles 14 but be brand-locked or restricted to use with vehicles 14 from a single manufacturer or brand-locked to certain brands, allowing use with vehicles 14 from more than one but fewer than all manufacturers. Another implementation may restrict various features or access to certain control programs without verification of certain vehicle system configurations or proof of purchase, which may include confirmation of certain installed components. An example of this is requiring confirmation of an installation of a particular oversized turbo system, which may be from the provider associated with system 10, as a prerequisite before the system will authorize a workshop VO device's 60a access to a corresponding engine tune that was specifically developed by the provider for that particular oversized turbo system.

Still referring to FIG. 2, retail VO device 60b may be usable by a single user and with a single vehicle. This may be accomplished by way of vehicle identification (VIN) locking the particular retail VO device 60b to the retail user's vehicle. A VIN lock can be determined through a stored record of the vehicle's VIN as associated with the serial number or other unique identifier of that particular retail VO device 60b, with provider-side system 30 only granting various permissions for matched VIN and VO device 60b serial numbers. Besides a VIN lock that ties use of a particular retail VO device 60b to a particular vehicle, the retail VO device 60b may define a retail locked state, in which it restricts certain functions available through system 10 for modifying the associated vehicle 14. This allows, for example, a retail user to use the retail VO device to tune or otherwise work on their personal vehicle, as a hobbyist or privateer while accessing a smaller library of programs or other features, which may require further permissions granted from the provider to access additional features. Retail platform 110 may further provide tiered permissions, with different levels of access to programs or features and/or additional libraries of associated products. It is contemplated that before a retail user received the retail VO device 60b, the retail VO device 60b may be preprogrammed with a certain tune or other program or feature, either from a shop user or technician of the dealer platform 100 or directly from the provider, to correspond to a particular upgrade or other modification that the retail user purchased for use with vehicle 14.

Figure 3:
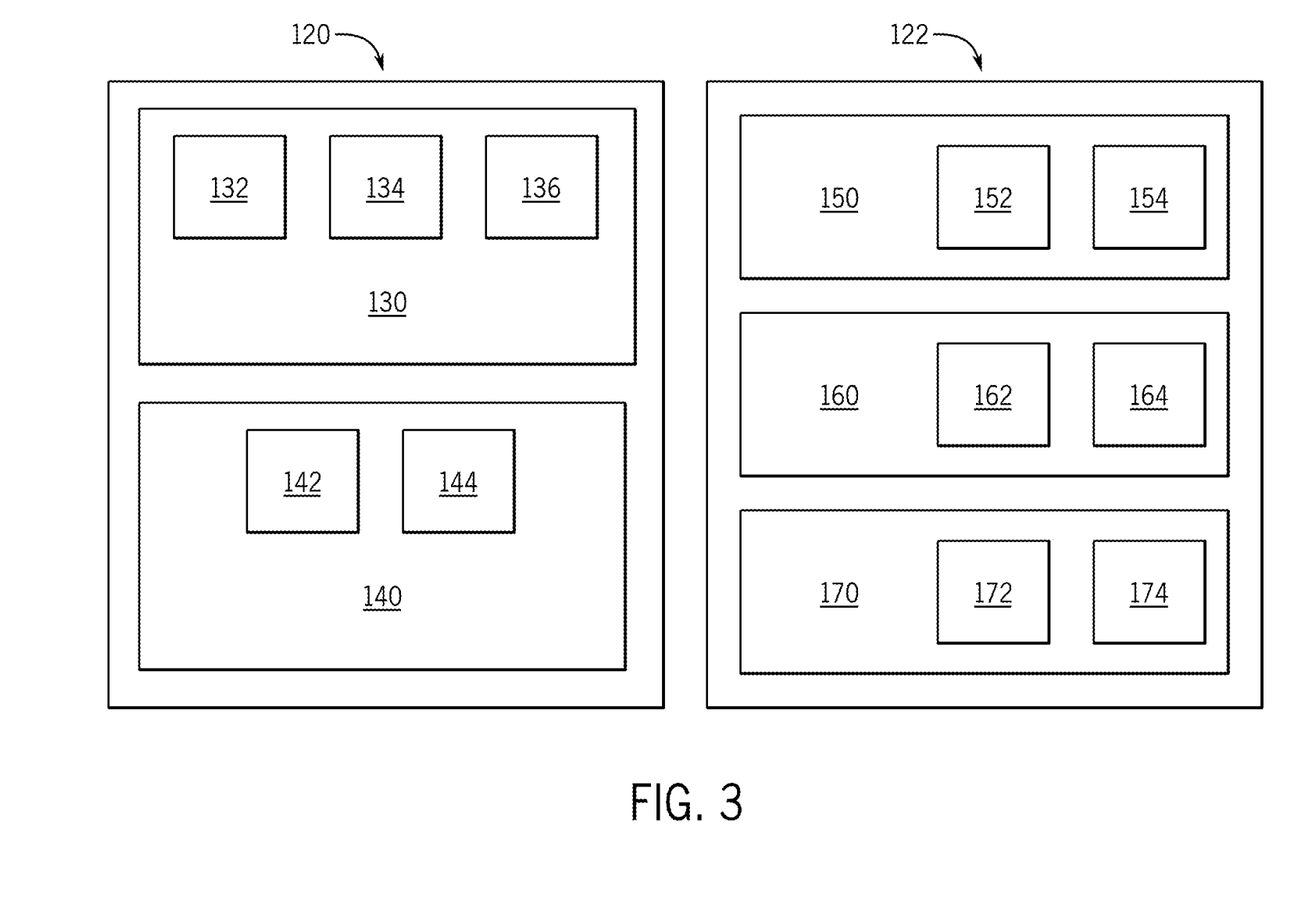
FIG. 3 is a schematic representation of various vehicle functions that are modifiable through the system.

Referring now to FIG. 3, the vehicle functions that system 10 can modify include various power or performance functions 120 as well as display and other accessory functions 122. Performance functions 120 typically relate to controls from the ECU 16 and TCU 18 and their corresponding control programs. Examples include engine tunes 130 that are stored and used by ECU 16 to control the vehicle's 14 engine. Engine tunes 130 may provide control algorithms for controlling various engine systems and components such as boost control 132 for forced-air induction system, timing control 134 for ignition systems, and fuel injection mapping or control 136 for fuel delivery systems. Transmission tunes 140 are stored on and used by TCU 18 to control the vehicle's 14 transmission. Transmission tunes 140 may provide control algorithms for controlling various transmission systems and components such as line pressure control 142 for transmission clutch and shifting systems and lockup-clutch control 144 for torque converter systems. Accessory functions 122 typically relate to vehicle functions other than powertrain performance functions, such as those controlled by BCM 20, DCM 22, GCM 24, and SCM 26. Examples include body accessory programs 150 that are stored on and used by BCM 20 that may control body-related accessories such as lighting control 152, security control 154, and/or other control of other accessories. Dash control programs 160 are stored on and used by DCM 22 to control dashboard display 23 (FIGS. 5-7) to control how and what information is displayed through it, such as GUI programming or control that may include information control 162 and position control 164 of the information with respect to the dashboard display 23. Suspension control programs 170 are stored on and used by SCM 26 to control suspension characteristics and may include shock control 172 such as individual control of damping, rebound, movement/stiffness, of the individual shock absorbers as well as ride-height control 174 or sway-bar control such as sway-bar disconnecting control (not labeled).

Figure 4:
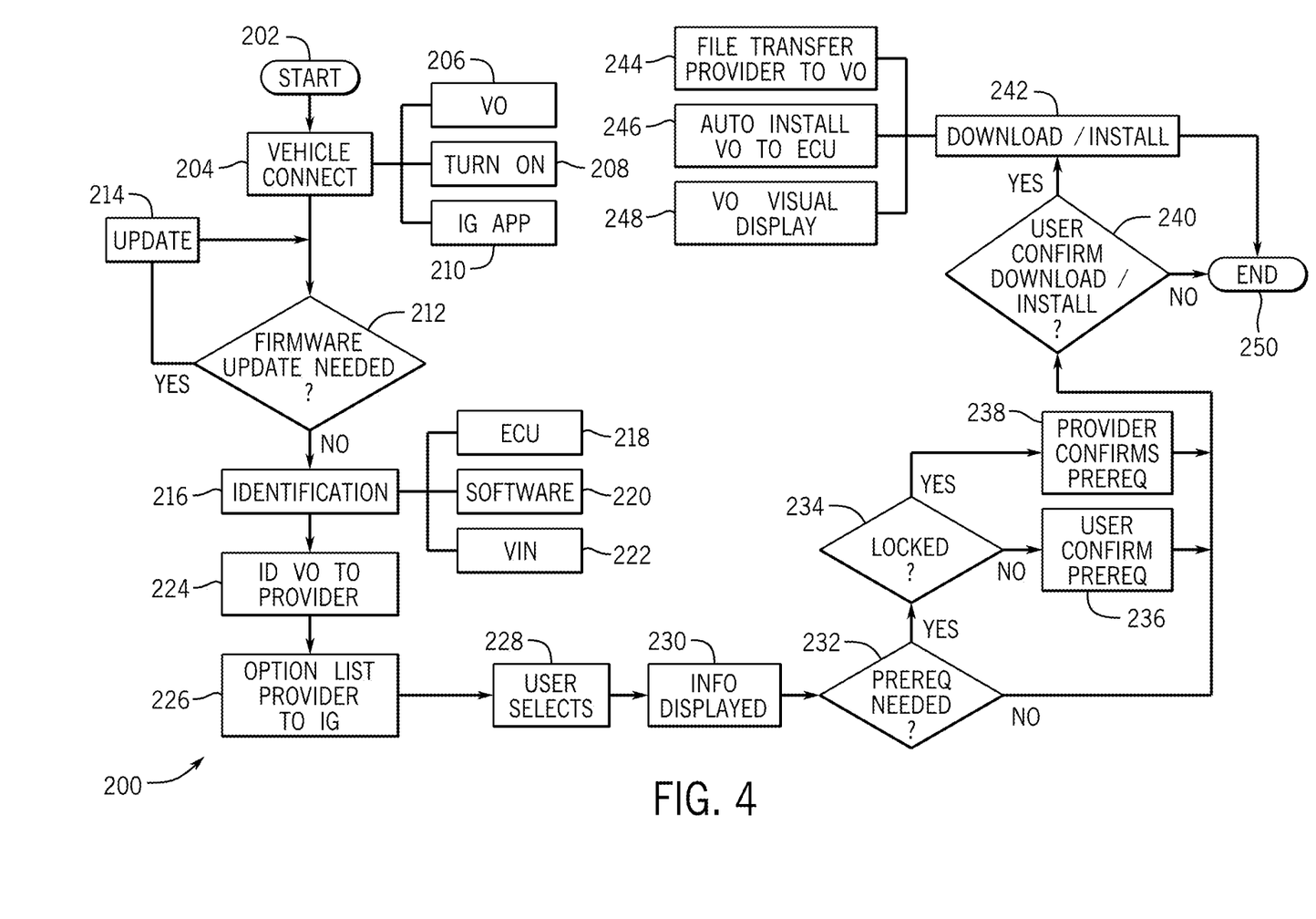
FIG. 4 is a flowchart illustrating vehicle system reconfiguration(s) during a modification session accordance with an aspect of the invention.

Referring now to FIG. 4 and with background reference to FIG. 1, a modification session is represented as method 200 of using system 10 for reconfiguring vehicle systems. This method 200 is represented as an engine tune ECU flash implemented on the dealer platform 100 and starts at block 202. At block 204, a vehicle connection is made, which may include connecting the workshop VO device 60a into diagnostic port 26 at block 206 and the vehicle 14 is keyed on/turned on at block 208. IG device's 70 APP is activated at block 210, which typically includes connecting to the internet and establishing communications with the provider-side system 30 through its internet connection. At decision block 212, the IG device's 70 APP facilitates communication between workshop VO device 60a and provider-side system 30 to determine if the workshop VO device's 60a firmware needs to be updated. If a firmware update is needed, then at block 214, workshop VO device 60a receives updated firmware from provider-side system 30 by way of IG device 70 and its internet connection. At block 216, workshop VO device 60a identifies the vehicle 14 to which it is connected and related information. This includes automatically analyzing and identifying the vehicle's 14 ECU type, software identification, VIN, and related information, as represented at blocks 218, 220, 222. The identification information is sent by workshop VO device 60a, through ID device's 70 internet connection, to the appropriate server(s) of the provider-side system 30, as represented at block 224.

Still referring to FIG. 4, provider-side system 30 determines compatible software or tunes available for that particular vehicle 14 and transmits a list of software versions/options such as engine tunes for display on the IG device 70, at block 226. The provider-side system 30 may send other information to display through ID device's 70 APP, such as workshop VO device's 60a serial number, the vehicle's VIN, the ECU's status, and messages relating to component or features, statuses, or processes, such as battery voltage, ECU flash process, and/or others. Provider-side system 30 may send dealer account information for display through IG device's 70 APP, which may include available credits for the dealer's account, credits previously used that are associated with the particular vehicle 14 currently being tuned, and pricing information such as credits required for each of the engine tunes or other software features in the list of options.

Still referring to FIG. 4, at block 228, the user, e.g., technician at the dealer, selects the tune from the list of options/tunes. This typically includes pressing an icon or graphical button displayed at the GUI of the IG device's 70 APP. The tune selection at IG device's 70 APP is communicated through the internet to provider-side system 30. Provider-side system 30 retrieves corresponding file information from its servers and sends the file information about the selection back to IG device's 70 APP, which displays it for analysis by the user, as represented at block 230. The information may include prerequisites for installing the tune. For example, if a tune requires greater fuel flow rate than an OEM/stock application, then a prerequisite for that tune is a high-flow fuel pump. As represented at decision blocks 232, 234, for tunes that have prerequisites, how users may proceed depends on whether the particular tune is locked or unlocked. If the tune is unlocked, then the user may advance through the process by providing user-side confirmation to confirm (e.g., without provider-side redundant confirmation) that the prerequisite is met, as represented at block 236. This is typically done by the user pressing an icon or graphical button displayed at the GUI of the IG device's 70 APP that confirms the required hardware is installed and acknowledges various required operational requirements that are presented in the displayed file information. In one example, a high-flow fuel pump and a certain octane-level of fuel is required, with the user confirming that vehicle 14 has a suitable high-flow fuel pump and acknowledges the fuel's octane rating that must be used by pressing a corresponding icon/button(s). If the tune is locked, then it is still typically visible in the list of software versions/options, but the user cannot proceed without confirmation/authorization from the provider as provider-side confirmation. An example is a tune from the provider for a particular oversized turbo system. The tune can only be unlocked after the oversized turbo system or its components are purchased, typically from the provider. The provider's records of sales of oversized turbo systems are evaluated with respect to VINs of vehicles for which they were purchased. Correlations of component purchases compared to tune requests allow system 10 to unlock the tune for those particular vehicles 14, with provider-side confirmation. If the oversized turbo system or its components are not yet purchased, then the user may contact the provider and purchase them, allowing the provider to unlock the tune through the system 10 as a provider activation that corresponds to provider-side confirmation of prerequisites, as represented at block 238.

Still referring to FIG. 4, if there is no prerequisite at block 232, or if there is user confirmation at block 236 or provider confirmation at block 238 following block 234, then system 10 presents a request for the user to confirm that they want to download and flash the ECU, as represented at block 240. If the user confirms the desire to download and install the tune, as represented at block 242, then system 10 automatically transfers the file for the selected tune from provider-side system 30 to the workshop VO device 60a at block 244. As represented at block 246, once downloaded, workshop VO device 60a automatically flashes the ECU by installing the tune onto it. As represented at block 248, during the flashing procedure, workshop VO device's 60a display 84 may provide visually conspicuous indication of the flash/installation status. For LED implementations of VO device's display 84, different numbers or colors of LEDs may be illuminated based on a percentage of the flash/installation's completion. Typically, during the flashing/installation, the workshop VO device 60a and the IG device 70 do not have to be connected to each other because workshop VO device 60a may operate independently of the remainder of system 10 during the actual flashing/installation. After the flashing/installation is complete or if the user declines the installation confirmation, then the procedure ends at block 250, which also occurs if the user does not confirm the desire to start the automatic combined download and installation of the tune at block 240.

Although described with respect to an engine tune flash of an ECU, it is understood that system 10 can be used to reconfigure and modify other systems and functions of vehicle 14, including those controlled by those controlled by BCM 20 (FIG. 1), DCM 22 (FIG. 1), and SCM 26 (FIG. 1).

Figure 5:
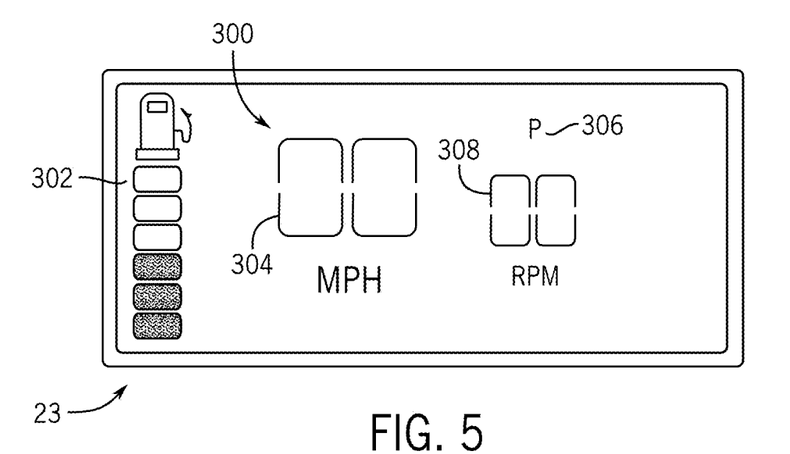
FIG. 5 is a schematic representation of various features of display in a pre-modified form in accordance with an aspect of the invention.
Figure 6:
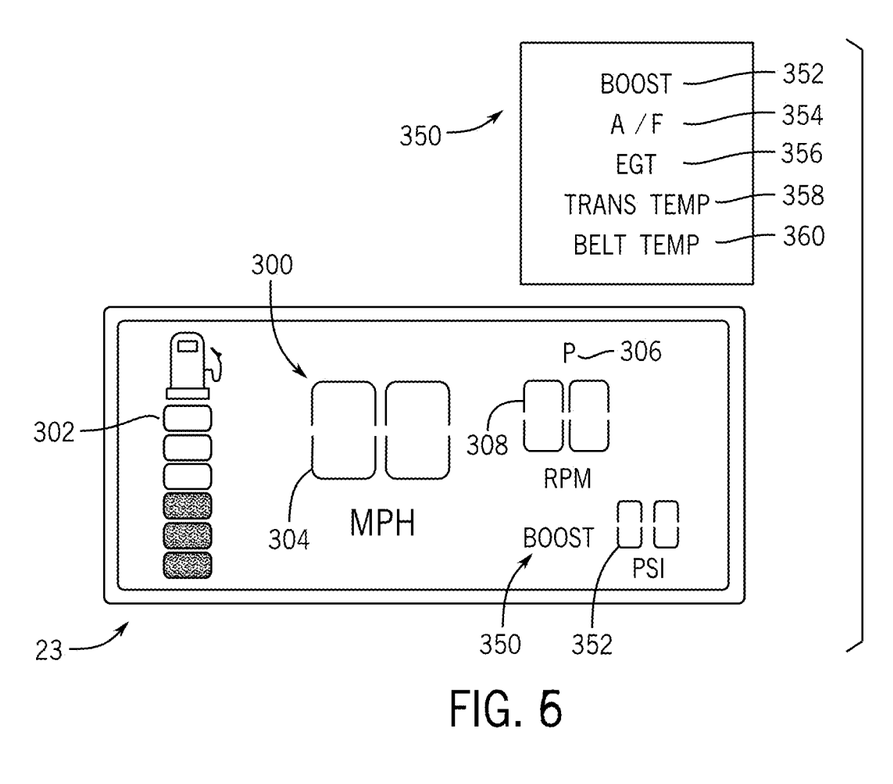
FIG. 6 is a schematic representation of various features of display in a modified form after a modification session in accordance with an aspect of the invention.

Referring now to FIGS. 5-6, an example is shown of flashing DCM 22 (FIG. 1) to modify the function(s) of an OEM or other dashboard display 23. The process described above with respect to FIG. 4 for flashing an engine tune to ECU 16 is substantially the same as used for flashing DCM 22. In this example, dashboard display 23 is shown in its OEM/stock form in FIG. 5 and its reconfigured form in FIG. 6 that has additional display features, after DCM 22 has been flashed. Referring now to FIG. 5, dashboard display 23 is shown displaying various forms of standard information 300, corresponding to that which is displayed by the dashboard display 23 in its original configuration. Standard information 300 is represented here as fuel level 302 on a fuel gauge, speed 304 on a speedometer, gear status on a gear indicator 306, and engine speed 308 on a tachometer. Flashing DCM 22 may change the manner in which the standard information 300 is displayed. This may include presenting or providing options for presenting different combinations of the standard information 300, different layouts, or different sizes or other visual presentation(s) of the standard information 300. Referring now to FIG. 6, instead of or in addition to presenting the standard information differently, flashing the DCM 22 may present additional information, shown as auxiliary information 350. Accordingly, system 10 can flash DCM 22 with custom programming from the provider to unlock or create features that are not present in the OEM/stock form, while displaying them on the OEM/stock dashboard display 23 in its reconfigured form following the flash. By implementing the auxiliary information 350, new information or reading such as boost pressure 352, air-fuel ratio 354, exhaust gas temperature 356, transmission temperature 358, and/or belt temperature 360 can also be displayed.

Figure 7:
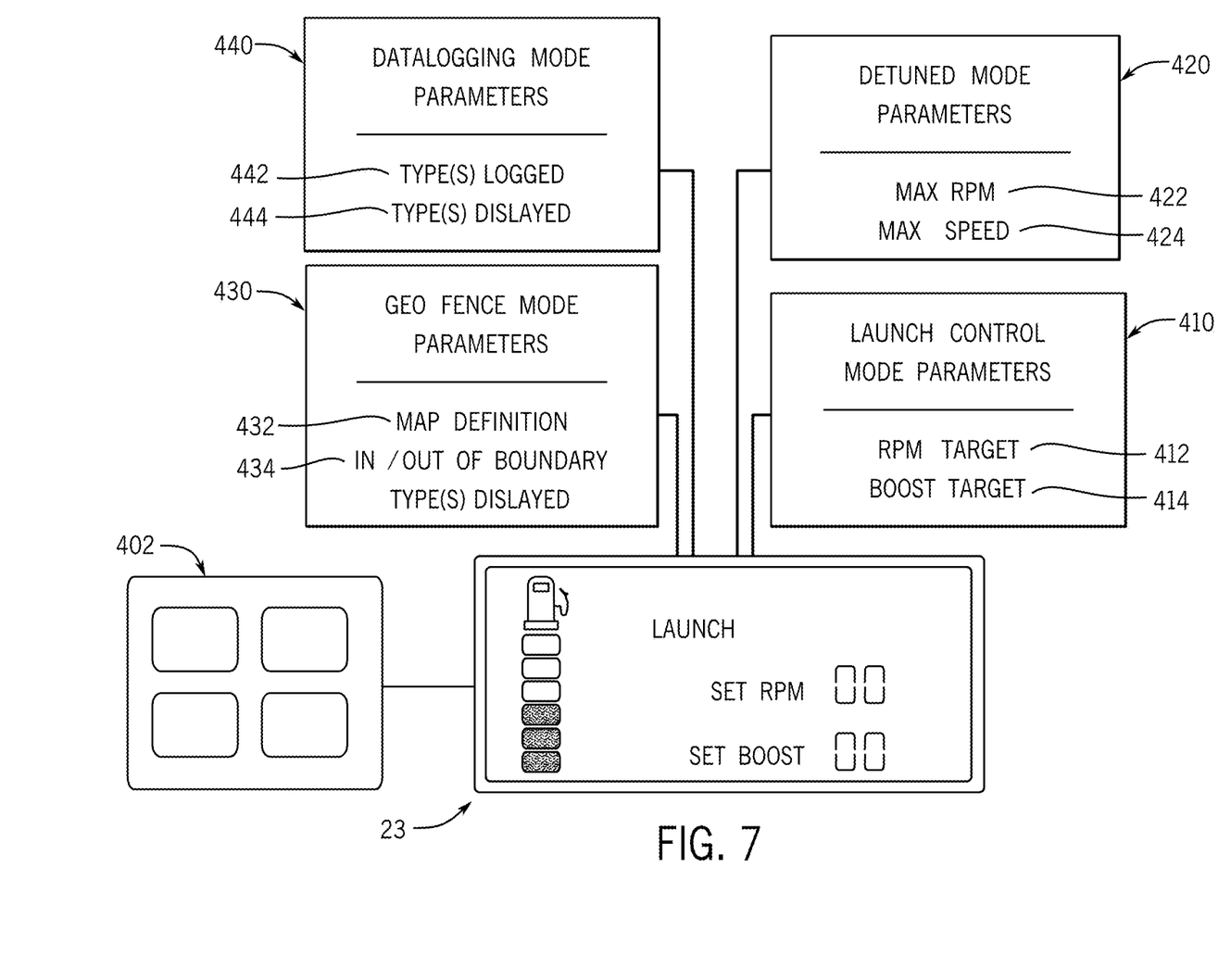
FIG. 7 is a schematic representation of various features of display in another modified form after a modification session in accordance with an aspect of the invention.

Referring now to FIG. 7, other examples of reconfiguring or modifying systems and functions of vehicle 14 include flashing or otherwise modifying operations of more than one of the vehicle controllers within vehicle control system 12 (FIG. 1). This is represented in FIG. 7 as auxiliary modes, which are additional vehicle operational modes that were not available in the previously unmodified vehicle 14. Like flashing DCM 22, the process described above with respect to FIG. 4 for flashing an engine tune to ECU 16 is substantially the same as used for flashing one or more vehicle controllers to provide an auxiliary mode(s). Regardless of how many controllers are reconfigured with the tune(s), auxiliary mode may have all of its parameters set in the tune(s) itself or may allow for user-adjustable parameters. This may include adjustable parameters that can be redefined at the vehicle 14 itself, for example, through an OEM/stock keypad 402 or other stock or add-on vehicle input/output system, which typically utilizes the dashboard display 23 as information display system while navigating through menus and otherwise inputting information through the keypad 402. It is understood that such adjustable parameters can also be through the VO device 60 plugged into the vehicle's diagnostic port 28 by way of the IG device's 70 APP.

Still referring to FIG. 7, one example of an auxiliary mode is launch control mode 410, which may be installed during a compound flash procedure that flashes or updates software of multiple vehicle controllers, such as flashing both the DCM 22 and the ECU 16. Launch control mode 410 is configured to assist the user accelerate vehicle 14 from a standstill by electronic controls that manage engine torque at launch relative to the vehicle's 14 traction characteristics to help maximize available power while reducing wheel-spin. Launch control mode 410 may have definable parameters such as an RPM target 412 and a boost target 414. The RPM target 412 may set a rev-limit at the defined RPM engine speed that is maintained by the ECU 16, for example, retarding the ignition and/or over-fueling when the rev-limit is reached in order maintain the RPM target 412 regardless of throttle position, allowing a user to apply a full-throttle condition that can be maintained during launch without risk of overrevving the engine before launch and while maintaining an optimum RPM for the launch. For vehicles 14 with forced-air induction, maintaining the rev-limit through the RPM target 412 builds boost while the vehicle 14 is at a standstill before its launch. Boost target 414 allows for ECU 16 to control engine speed or, for example, an electronically controlled wastegate to maintain the pounds-per-square-inch (PSI) boost pressure within the intake manifold. Launch control mode 410 may recognize a signal, such as through BCM 20, that initiate vehicle launch during the launching procedure. This may be the BCM's 20 or an electronic brake control module's (ECBM, not shown) recognition of release of a brake pedal, indicating that the user wants to launch vehicle 14.

Still referring to FIG. 7, another example of an auxiliary mode is detuned mode 420, which may also be installed during a compound flash procedure that flashes or updates software of multiple vehicle controllers, such as flashing both the dashboard display 22 and the ECU 16. Detuned mode 410 is configured to allow, for example, the vehicle's 14 owner to establish different, lessened, performance characteristics, for example, when the vehicle 14 will be used by a less-experienced driver. Detuned mode 410 may have definable parameters such as a maximum RPM target 422 that sets/redefines the vehicle's rev-limit and a maximum speed target 424 that sets acts as an electronic governor that limits the vehicle's 14 speed. Similar to the RPM target 412, in launch control mode 410 detuned mode's 410 maximum RPM and speed targets 422, 424 may be established by the ECU 16, for example, retarding the ignition and over-fueling when the maximum value is reached.

Still referring to FIG. 7, another example of an auxiliary mode 400 is geo-fence mode 430, which may also be installed during a compound flash procedure that flashes or updates software of multiple vehicle controllers, such as flashing the DCM 22 and the ECU 16. Geo-fence mode 430 is configured to change the vehicle's 14 performance characteristics based on its location. In one example, the vehicle's 14 performance may be enhanced when the vehicle 14 is in a certain location/area. This can include allowing and/or automatically implementing a high-performance mode when the vehicle 14 is recognized as within a boundary of a race-venue or other appropriate venue. In another example, the vehicle's 14 performance may be decreased when the vehicle 14 is in a certain location/area. This can include allowing and/or automatically implementing a detuned mode when the vehicle 14 is recognized as within a boundary of an appropriate venue. Furthermore, geo-fence mode 430 may substantially hinder vehicle performance in certain situations/locations, for example, forcing the vehicle 14 into a limp home mode when the in certain locations/areas. One example is that geo fence mode 430 may be implemented on a vehicle 14 with deleted or otherwise without emissions components that is forced into limp home mode whenever vehicle 14 is in a location/area that requires emissions components. Geo-fence mode 430 may provide staged-performance controls of vehicle 14 based on proximity to various boundaries. By way of geo-fence mode 430, vehicle 14 may continuously monitor its location. As the vehicle 14 approaches a boundary that designates a change in allowed/disallowed zones, step-wise reduction(s) in, for example, torque, power, or speed may be implemented. Crossing the boundary between allowed-disallowed zones may result in geo fence mode 430 forcing vehicle 14 into limp home mode. Geo fence mode 430 is shown here with a map definition 432 as a definable parameter, which establishes, for example, the boundaries of allowed/disallowed zones as well as any transitional zones, based on the particular location/area. Boundary response 434 is also a definable parameter, which establishes how the control system adjusts the performance characteristic(s) based on its location/area. Geo fence mode 430 is typically implemented without flashing the vehicle's GCM 24, but instead utilizes data from the vehicle's internal geo controller, such as GCM 24. If vehicle 14 does not have its own internal geo controller, data from an external GPS module may be used to implement geo fence mode 430. In that case, an external GPS module is arranged to communicate with the VO device 60, such as by way of a wired USB-C connection. The VO device's 60 internal logic receives and interprets geo data, whether from GCM 24 or an external GPS module, and can set different internal parameters to create permissions or restrictions for the vehicle's ECU 16, depending on the particular intended boundary response 434. In one example, when operating within an acceptable pre-determined geo fence area, the vehicle 14 operates like normal, but when operated outside of a pre-determined geo fence area, the vehicle 14 can be put into a "limp home mode" where the vehicle 14 operates at 10% of its power limit for example. The particular boundary response 14 can be implemented in a variety of ways using a variety of different strategies of limitations when the geo fence strategy is implemented such as, racetrack specific tune(s) when the vehicle is at a particular racetrack. Furthermore, geo fence mode 430 may be provided and implemented as one or more packages of tunes or programs, such as different racetrack package(s) or tune bundle(s) that has different tunes or performance strategies different selected racetracks.

Still referring to FIG. 7, another example of an auxiliary mode 400 is datalogging mode 440, which may also be installed during a compound flash procedure that flashes or updates software of multiple vehicle controllers, such as flashing both the dashboard display 22 and the ECU 16. Datalogging mode 440 is configured to allow, for example, vehicle 14 to record performance and/or other operational data during use. The type of data that can be logged is defined by data type 442. The data types 442 may include, for example, specific vehicle performances such as lap times as well as system performance characteristics such as boost pressure, air/fuel ratio, oil pressure, fuel pressure, exhaust gas temperature, transmission temperature, belt temperature, and others. As represented by display type 444, datalogging mode 440 may also allow for viewing, real-time through the IG device's 70 APP or dashboard display 23, values of data that is being logged, similar to the modified display described above with respect to the flashing of DCM 22 in FIGS. 5-6.

Figure 8:
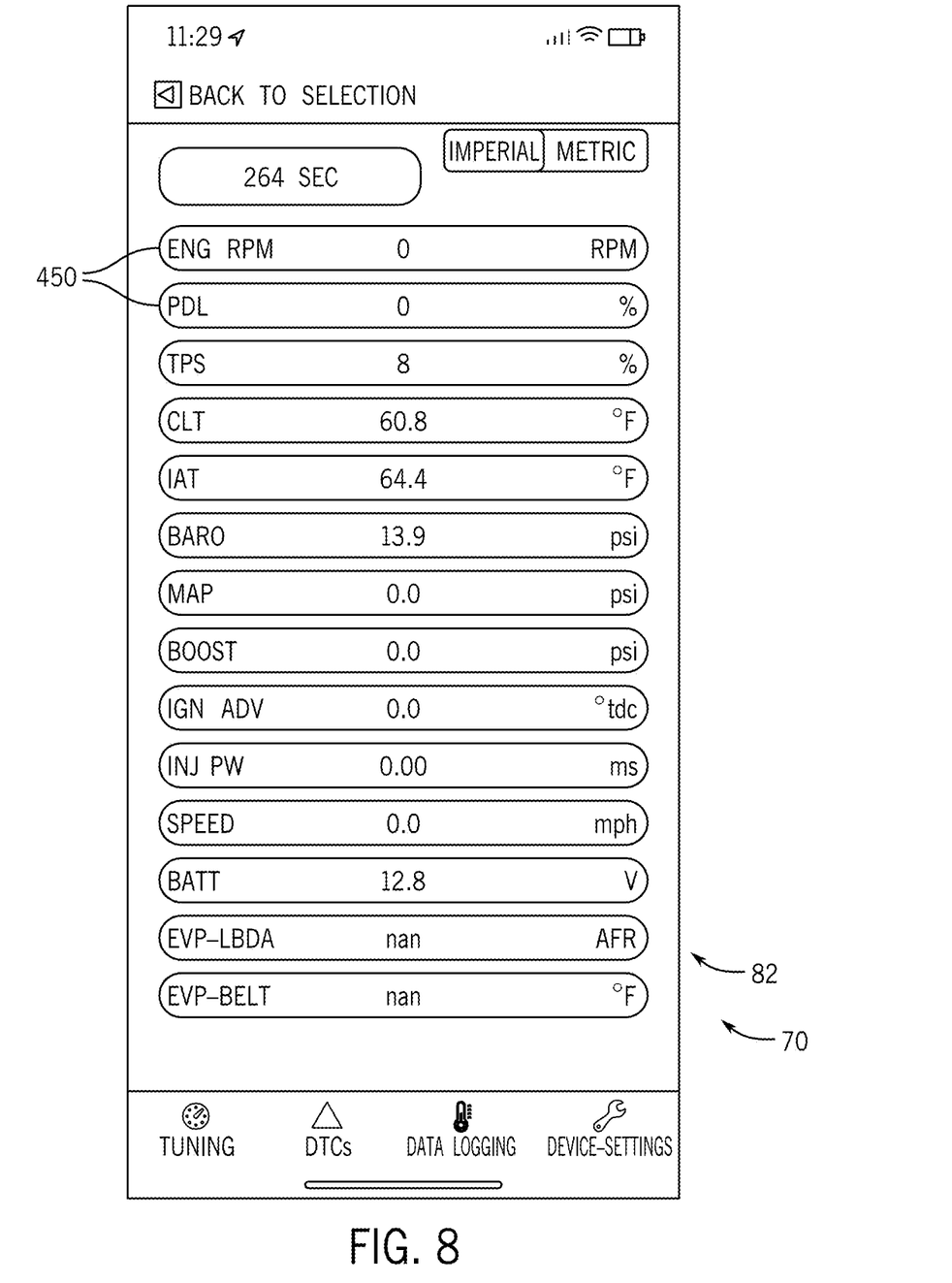
FIG. 8 is an example of an information gateway device displaying information in a datalogging mode.
Figure 9:
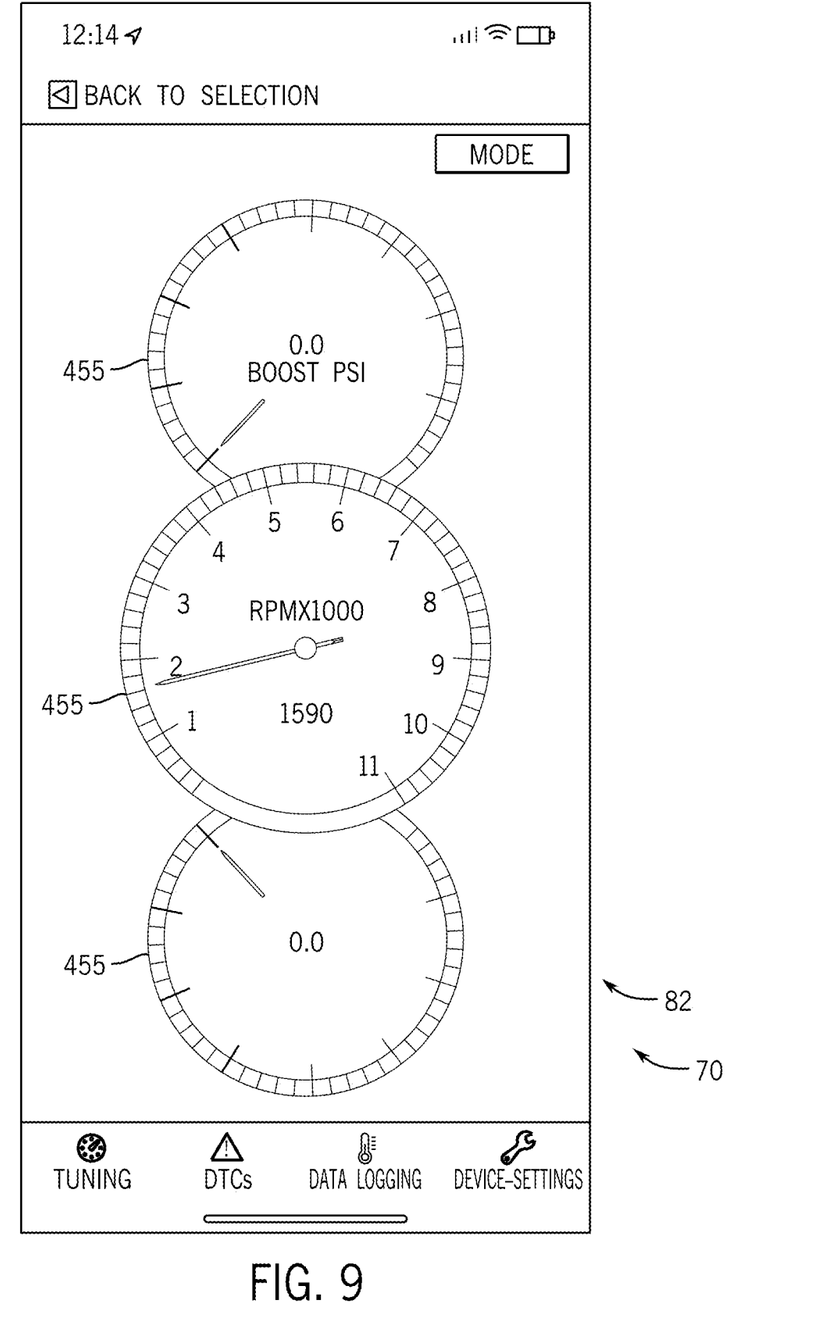
FIG. 9 is another is an example of an information gateway device displaying information in a datalogging mode.
Figure 10:
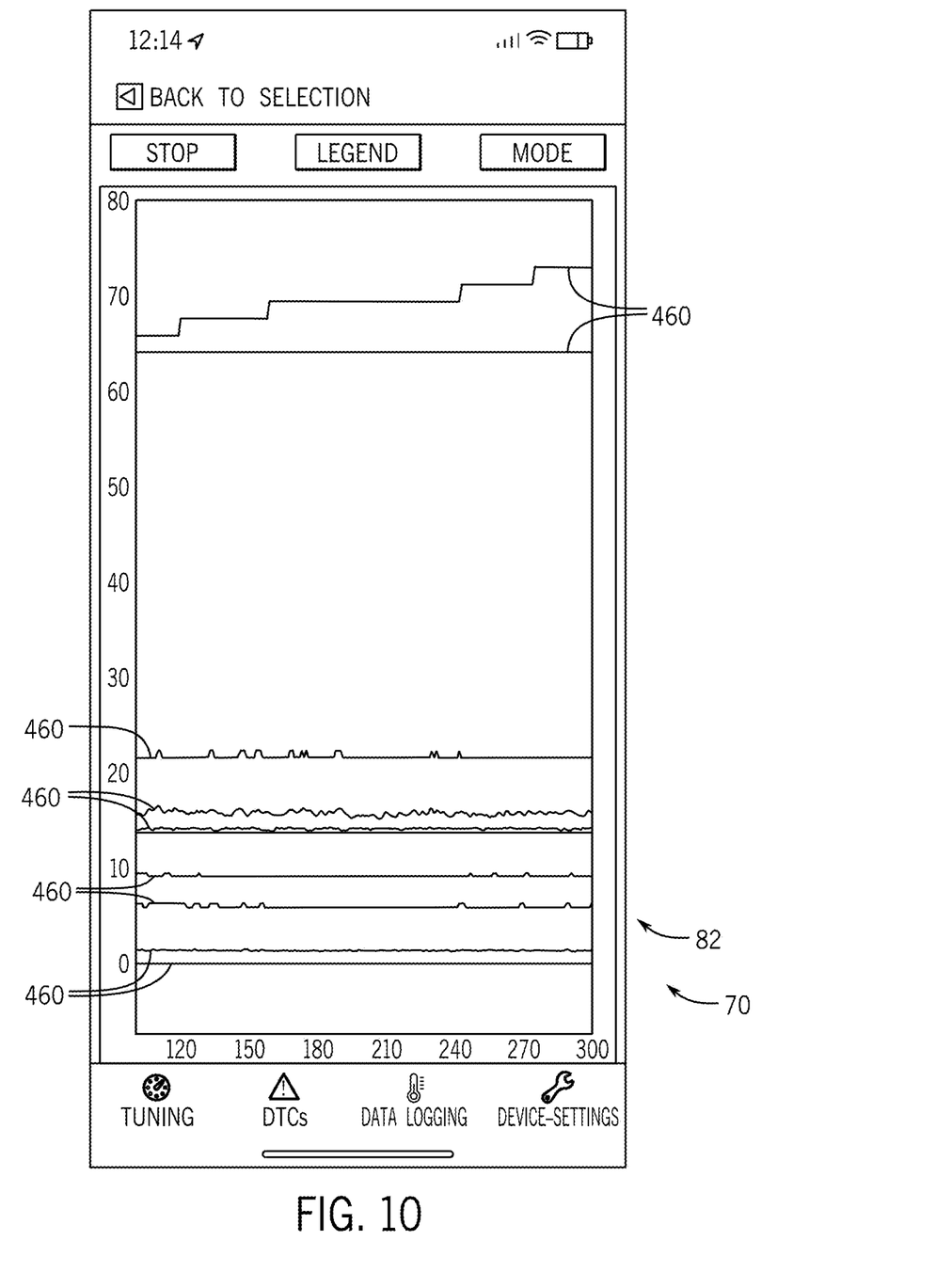
FIG. 10 is another example of an information gateway device displaying information in a datalogging mode.

Referring generally to FIGS. 8-10, various display representations of datalogging mode 440 (FIG. 7) are shown. Referring now to FIG. 8, a real-time display of data through the IG device's 70 APP is shown as GUI 82 that presents a fielded-value display. The GUI 82 includes multiple display fields 450 that correspond to different components or characteristics that are being monitored in the datalogging mode 440. The information that is displayed in real-time in the display fields 450 are generally arranged in three columns in this example, shown with the information in the left-hand column as the name or title of the component or characteristic being monitored. In this example, as shown in the left-hand column, the GUI 82 can display real-time data for engine speed, pedal position, throttle position, coolant temperature, intake air temperature, barometric pressure, manifold absolute pressure, boost, ignition advance, injector(s) pulse width, vehicle speed, battery voltage, lambda (air/fuel ration), and belt temperature. The information in the middle column provides the corresponding real-time value(s), and the information in the right-hand column provides the associated unit(s) for the real-time value(s). Other GUIs 82 may be implemented to provide other informational displays while in datalogging mode 440 (FIG. 7).

Referring now to FIG. 9, another real-time display of data through the IG device's 70 APP is shown as GUI 82 that presents a gauge-value display. The GUI 82 includes multiple virtual or digital gauges 455, shown here as a boost gauge that displays a real-time boost value, a tachometer that displays a real-time engine speed, and an air/fuel gauge that displays a real-time air/fuel ratio value. Switching from the fielded-value display (FIG. 8) to the gauge-value display (FIG. 9) may be achieved by a simple toggle function, such as tapping a mode button on the GUI 82.

Referring now to FIG. 10, another real-time display of data through the IG device's 70 APP is shown as GUI 82 that presents a graph-value display. The GUI 82 is shown here simultaneously presenting multiple real-time values, graphing them over time. The data lines 460 in this example of FIG. 10 correspond to the data values of the fielded-value display (FIG. 8), although it is understood that individual and/or different groups of data may be presented in other implementations. Similar to switching from the fielded-value display (FIG. 8) to the gauge-value display (FIG. 9), switching from the gauge-value display (FIG. 9) to the graph-value display (FIG. 10) may be achieved by a simple toggle function, such as tapping the mode button on the GUI 82 when the GUI 82 is showing the gauge-value display (FIG. 9). When showing the graph-value display (FIG. 10), an additional tap of the mode button may return the IG device's 70 APP to showing the original fielded-value display (FIG. 8).

Referring again generally to FIGS. 8-10, regardless of the particular component or characteristics being monitored while in datalogging mode 440 (FIG. 7), data that represents the values may be logged or stored, typically in memory of the IG device 70. The data may be logged as, for example, CSV (comma-separated values) or other appropriate data structure(s) that provides a data file that can be analyzed at a later time. The data file with the information from the datalogging session(s) may be transferred to other devices by way of IG device 70 and its internet connection. Typically, the IG device 70 will transfer the data file by uploading it to the appropriate server(s) of the provider-side system 30, through which it can be made accessible by the provider's technician(s) or other technician, such as a technician of the dealer platform 100 for analysis.

Referring again to FIG. 7, it is understood that datalogging mode 440 (and/or other modes) may further implement various external devices, such as an external GPS module that is connected to VO device's 60 USB-C port or otherwise communicates with it. This facilitates using the external device(s) to cooperate with the VO device 60 to provide auxiliary modes or features to vehicle 14. In the example of an external GPS module, besides GPS-type mapping functions, its cooperation with VO device 60 may allow for performance tracking through data-logging, such as recording and/or displaying lap-times, 0-60 miles per hour (MPH) times, ¼ mile times, or the like.

Besides flashing to reconfigure software of the various vehicle controllers, user-side system 32 may further be implemented as a vehicle troubleshooting or diagnostic system for reading and clearing diagnostic trouble codes (DTCs). Such diagnostic session can be implemented during the vehicle system modification session or it may be performed during a separate diagnostic session. In one example, a diagnostic session begins the same way as the vehicle system modification session, but instead of selecting a tune or other upgrade, the user selects a DTC-related icon or graphical button displayed at the GUI of the IG device's 70 APP. This advances further through the diagnostic session and may graphically present at least one other icon or graphical button, such as a—Read DTCs—button or a—Clear DTCs—button. Selecting the—Clear DTCs—option automatically clears any DTCs from the ECU 16 whereas selecting the—Read DTCs—option allows the VO device 60 to interrogate the ECU for any DTCs. In one implementation, the VO device 60 transmits the DTC information to the provider-side system 30. Provider-side system 30 may compare the particular DTC with stored information about what may be causing the DTC in that particular vehicle 14. The provider-side system 30 may transmit the possible causes or other DTC troubleshooting information back to be displayed for the user through the GUI of the IG device's 70 APP.

Other aspects and characteristics of a system 10 for reconfiguring vehicle systems to modify corresponding vehicle functions falling within the scope of the present invention are disclosed in the drawings attached hereto, the disclosure of which is expressly incorporated herein.

Many changes and modifications could be made to the invention without departing from the spirit thereof. The scope of these changes will become apparent from the appended claims.

What is claimed is:

1. A system for reconfiguring vehicle systems of a vehicle to modify corresponding vehicle functions during a vehicle system modification session, wherein the vehicle includes a vehicle control system configured to control various functions of the vehicle and a vehicle diagnostic port operably connected to a data bus of the vehicle, the system comprising:
a provider-side system, including:
at least one server having server memory storing multiple control programs, wherein at least one of the multiple control programs is storable on a memory storage device in the vehicle control system and used by the vehicle control system to control a corresponding vehicle function;
a user-side system, including:
an information gateway (IG) device configured to convey information during the vehicle system modification session, wherein the IG device is configured as a human-machine-interface (HMI) through which a user interacts with the system from within the user-side system to facilitate the vehicle system modification session; and
a vehicle operator (VO) device that is:
removably connected to the vehicle diagnostic port;
in communication with the IG device for:
displaying information at the HMI for user receipt within the user-side system;
conveying information corresponding to the vehicle and the vehicle control system being modified to the provider-side system during the vehicle system modification session.

2. The system of claim 1, wherein the vehicle control system includes a vehicle controller defined by at least one of:
an engine control unit (ECU);
a transmission control unit (TCU);
a body control module (BCM);
a shock control module (SCM); and
a dashboard cluster module (DCM).

3. The system of claim 2, wherein the vehicle controller is an ECU and the multiple control programs include multiple engine tunes usable by the ECU to control an engine of the vehicle, and wherein:
the VO device automatically conveys information corresponding to the ECU and the vehicle to the provider-side system during an identification phase of the vehicle system modification session to the IG; and
the provider-side system determines a set of engine tunes that is suitable for use with vehicle based on the information corresponding to the ECU and the vehicle that was communicated from the VO device through the IG to the provider-side system.

4. The system of claim 2, wherein the vehicle controller is a TCU and the multiple control programs include multiple transmission tunes usable by the TCU to control a transmission of the vehicle, and wherein:
the VO device automatically conveys information corresponding to the TCU and the vehicle through the IG device to the provider-side system during an identification phase of the vehicle system modification session; and
the provider-side system determines a set of transmission tunes that is suitable for use with vehicle based on the information corresponding to the TCU and the vehicle that was communicated from the VO device through the IG device to the provider-side system.

5. The system of claim 2, wherein the vehicle controller is a BCM and the multiple control programs include multiple body accessory programs usable by the BCM to control a function of a body accessory, and wherein:
the VO device automatically conveys information corresponding to the BCM and the vehicle through the IG device to the provider-side system during an identification phase of the vehicle system modification session; and
the provider-side system determines a set of body accessory programs that is suitable for use with vehicle based on the information corresponding to the BCM and the vehicle that was communicated from the VO device through the IG device to the provider-side system.

6. The system of claim 2, wherein the vehicle controller is an SCM and the multiple control programs include multiple shock absorber tunes usable by a dashboard display to control a function of a shock absorber, and wherein:
the VO device automatically conveys information corresponding to the shock absorber and the vehicle through the IG device to the provider-side system during an identification phase of the vehicle system modification session; and
the provider-side system determines a set of shock absorber tunes that is suitable for use with vehicle based on the information corresponding to the shock absorber and the vehicle that was communicated from the VO device through the IG device to the provider-side system.

7. The system of claim 2, wherein the vehicle controller is a DCM and the multiple control programs include multiple dashboard display programs usable by a dashboard display to control a function of the dashboard display, and wherein:
the VO device automatically conveys information corresponding to the dashboard display and the vehicle through the IG device to the provider-side system during an identification phase of the vehicle system modification session; and
the provider-side system determines a set of dashboard display programs that is suitable for use with vehicle based on the information corresponding to the dashboard display and the vehicle that was communicated from the VO device through the IG device to the provider-side system.

8. The system of claim 1, further comprising multiple operational platforms including a dealer platform and a retail platform, and wherein:
a first VO device defines a workshop VO device that is configured for use through the dealer platform;
a second VO device defines a retail VO device that is configured for use through the retail platform; and
the retail VO device has fewer permissions and access to fewer control programs stored at the provider-side system than the workshop VO device.

9. The system of claim 1, wherein the VO device is one of multiple VO devices and the provider-side system is configured to configure each of the VO devices into at least one of multiple modes to unlock or lock at least one feature of the respective VO device.

10. The system of claim 9, wherein multiple modes of each VO device define:
- a workshop mode in which the VO device defines a workshop VO device that is configured to tune multiple vehicles; and
- a retail purchaser mode in which the VO device defines a retail VO device that is restricted to use with a single vehicle.

11. The system of claim 1, further comprising multiple operational platforms including a dealer platform and a retail platform, and wherein:
- a first user of the dealer platform defines a first dealer with a first dealer account associated with the dealer platform;
- the first dealer has multiple locations with a corresponding number of multiple dealer VO devices; and
- each of the multiple dealer VO devices at the multiple locations is associated with the first dealer account.

12. A system for reconfiguring vehicle systems of a vehicle to modify corresponding vehicle functions during a vehicle system modification session, wherein the vehicle includes a vehicle control system with a control system program configured to control various functions of the vehicle and a vehicle diagnostic port operably connected to a data bus of the vehicle, the system comprising:
- a provider-side system, including:
  - a server storing an updated control program to control a corresponding vehicle function;
- a user-side system, including:
  - a human-machine-interface (HMI) through which a user interacts with the system from within the user-side system;
  - a master controller device defined by a vehicle operator (VO) device that:
    - is removably connected to the vehicle diagnostic port;
    - communicates with the server of the provider-side system;
    - upon removable connection between the VO device and the vehicle diagnostic port, the VO device automatically:
      - determines whether firmware of the VO device requires updating; and
      - transmits information corresponding to the vehicle to the provider-side system; and
  - wherein based on the information automatically transmitted from the VO device to the provider-side system, the provider-side system:
    - automatically determines whether the updated control program is suitable for implementation with the vehicle; and
    - if suitable for implementation with the vehicle, automatically transmits at least one of:
      - the updated control program to the VO device for installation onto the vehicle control system; and
      - a list that includes the updated control program for display on the HMI.

13. The system of claim 12, wherein the VO device is configured to automatically:
- determine whether firmware of the VO device requires updating;
- update the VO device firmware, if required;
- analyze the vehicle for specific corresponding vehicle and vehicle control system information;
- transmit the vehicle and vehicle control system information to the provider side system;
- before a user selection through the user-side system.

14. The system of claim 1, wherein:
- the VO device defines an HMI of an HMI system; and
- the VO device includes at least one status indicator configured to indicate statuses or phases of the vehicle system modification session independent of the IG device; and
- the HMI system further includes the at least one status indicator of the VO device.

\* \* \* \* \*